June 29, 1965  H. R. DUCHESNEAU  3,191,309
SINE-SQUARE
Filed June 8, 1962  2 Sheets-Sheet 1
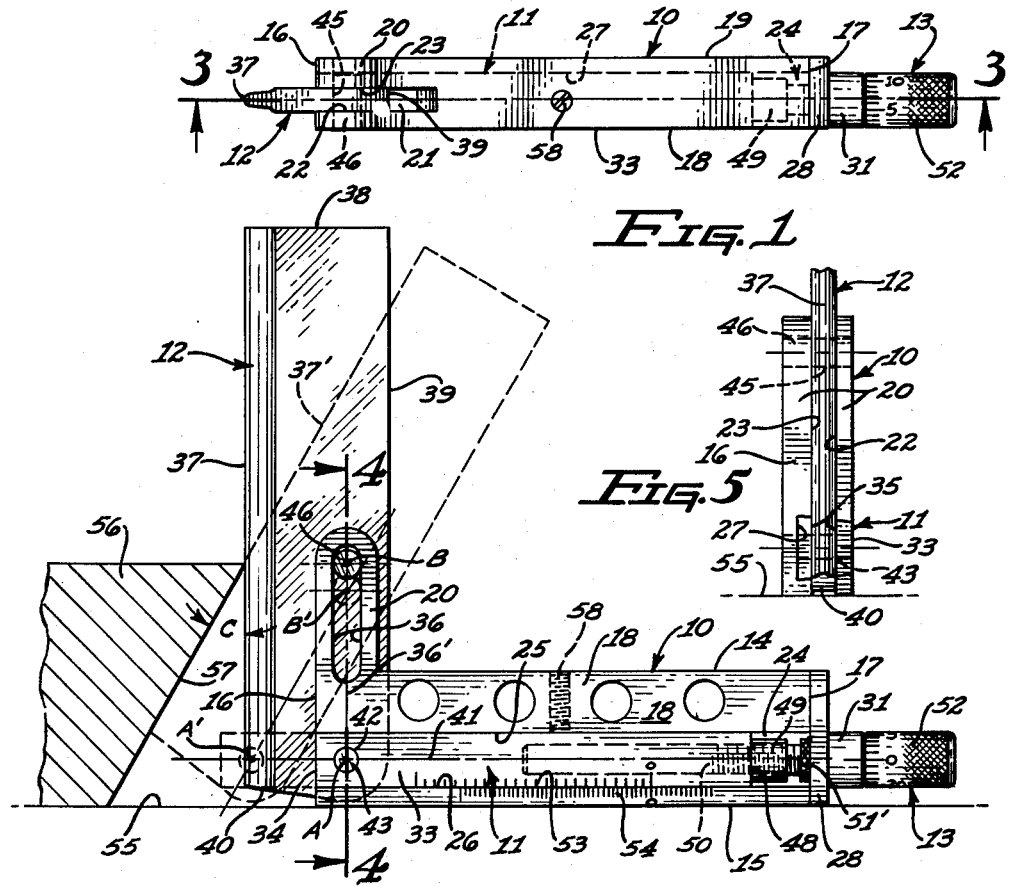
INVENTOR.
HERVE R. DUCHESNEAU.
BY
ATTORNEY.

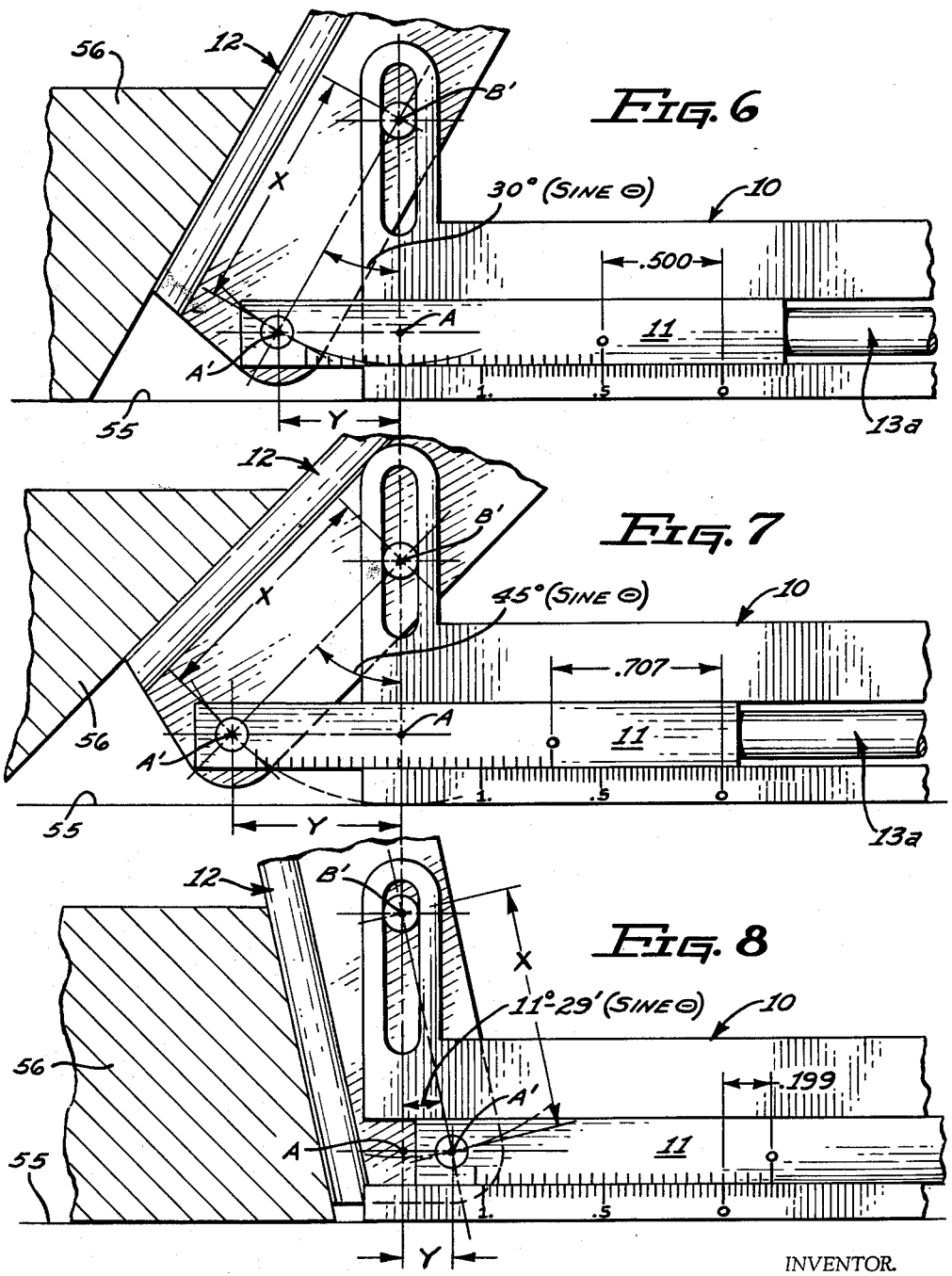

3,191,309
SINE-SQUARE
Herve R. Duchesneau, 4117 E. Buchanan,
Phoenix, Arizona
Filed June 8, 1962, Ser. No. 201,075
5 Claims. (Cl. 33—102)

The present invention relates to an instrument in the form of a protractor and termed a sine-square for use in determining the degree of an unknown angle.

As is well known in the art of tool and metal working industry the inspection of the parts must be performed with accuracy requiring, under present conditions, a considerable amount of time and effort and in many cases not resulting in the exactness required.

An object of the present invention is therefore to provide a sine-square which may be readily and conveniently handled to conform with an angle of unknown degree and give a reading whereby the exact degree of the measured angle is determined.

A further object of the invention is to provide a sine-square which may be applied to conform with an angle to be determined in degrees and by cooperation of the adjustable parts of the instrument to give indication of the sine of the angle being checked whereby the degree of the angle may be determined by reference to standard natural sine tables.

Other objects and advantages of the invention will be more fully understood by reference to the following description together with the accompanying drawing in which:

FIG. 1 is a plan view of a direct reading adjustable instrument incorporating the features of the present invention;

FIG. 2 is a left side elevation of the device shown in FIG. 1 with its body resting on a conventional surface plate and its blade contacting a workpiece as in actual use;

FIG. 3 is a longitudinal sectional view of the device shown in FIGS. 1 and 2 taken substantially on the line 3—3 of FIG. 1;

FIG. 4 is a vertical sectional view of the device taken substantially on the line 4—4 of FIG. 2;

FIG. 5 is a front elevation of the device shown in FIGS. 1 and 2;

FIG. 6 is a left side, fragmentary elevation of the device, similar to FIG. 2, but illustrating (in full scale) the functioning of the device when determining a thirty degree angle;

FIG. 7 is a view similar to FIG. 6, illustrating the functioning of the device when determining a forty-five degree angle;

FIG. 8 is a view similar to FIGS. 6 and 7, illustrating the functioning of the device when determining an eleven degree, twenty-nine minute angle on the opposite side of the vertical as that shown in FIGS. 6 and 7.

As shown, the present invention provides a sine-square in the form of an adjustable protractor unit comprising a body member 10, a sliding ram member 11, a straight edge or blade member 12, and a micrometer adjusting screw member 13. The assembly and functioning of these elements will be hereafter described.

The body member 10 consists of a substantially rectangular shaped longitudinal portion having a top surface 14, a bottom surface 15, front and rear end surfaces 16 and 17 respectively, a front side surface 18 and a rear side surface 19, all of said surfaces having a fine accurate finish, square and parallel one to the other, the purpose of which will hereinafter appear.

Integral with the front end, perpendicular to, and projecting upward from the top surface 14 of the body 10 is a blade supporting arm 20 which together with the front end 16 of the body is bifurcated to form a slot 21 having abutment surfaces 22 and 23 adapted to slidingly support the flat sides of the blade 12.

Extending longitudinally the full length of the body 10 is provided a dovetail type slot or rabbet 24 having tapered top and bottom surfaces 25 and 26 respectively (see FIG. 4), and a rear abutment surface 27, these surfaces of the rabbet being adapted to receive and contain in sliding relation, the wedge-shaped ram member 11 with its front face 33 in flush relation with the front side surface 18 of the body.

A plate 28 is removably secured to the rear end surface 17 of the body by means of screws 29 and has an arcuate bore 30 which receives and supports a stationary bearing sleeve 31 which in turn provides a bearing surface for a rotatable stem 32 of the micro screw 13. The ram 11 extends forward in the rabbet 24 so that its front end 34 is in flush vertical relation with the front end surface 16 of the body 10 and has provided therein a slot 35 which is vertically aligned with the slot 21 in the arm 20 and the body 10 to form a single vertical slot with aligned abutment surfaces 22 and 23 extending from the bottom surface 15 of the body through the top end of the arm 20 thus providing bearing surfaces for the flat sides of the body member 10 and serving to limit the transverse movement thereof.

The blade support arm 20 is provided with elongated slots 36 the vertical axis 36' of which is in exact parallel alignment with the front end surface 16 of the body 10 and perpendicular to the top and bottom surfaces 14 and 15 of the same. The slots 36 extend transversely through the side and abutment surfaces 22 and 23 of the arm 20.

The straight edge or blade member 12 comprises a steel bar substantially rectangular in transverse cross section having a front or work contacting face 37, which preferably has a rounded edge to provide a line contact with a workpiece, a top face 38 and a rear face 39, all of which surfaces are square and parallel one to the other. The blade may be of any practical length desired as long as the bottom edge 40 allows sufficient clearance for movement relative to the bottom surface 15 of the body. The thickness of the blade is slightly less than the width of the vertical slot 21 to provide a snug sliding and rotational fit between the abutment surfaces 22 and 23 of the slot and the flat faces of the blade.

The blade 12 is assembled in the body 10 and secured in pivoted relation to the sliding ram 11 in the following manner. The blade is slid into the slot 21 of the body and slot 35 of the ram until its rear face 39 projects slightly beyond the rear surface of the arm 20 and is aligned in exact parallel relation with the vertical axis 36' of the slots 36. With the bottom edge 40 of the blade clearing the bottom surface of the body 10 the blade is temporarily clamped in this position. The ram member 11 is slid forward until its front end 34 is in vertical alignment with the front end 16 of the body and is temporarily clamped in this position.

The vertical axis 36' of the slots 36 is extended downward by a scribed line through the body 10 and the ram 11 to the bottom surface 15. A horizontal center line 41 representing the axis of the micrometer adjusting screw member 13 and the center plane of the ram 11 is scribed on the exposed front face 33 of the ram 11. With the blade clamped in position as above described and at the intersection of vertical line 36' and horizontal line 41 or point "A", a hole 42 is line-bored through the ram 11 and the blade 12 but not into the body 10. The hole 42 is reamed to provide a press fit for a pivot pin 43 in the ram 11 and otherwise sized to provide a bearing portion 44 in the blade 12. Near the upper end of the slot 36 at point "B", another hole 45 is line-bored through the blade 12 to provide a press fit for a guide pin 46 which is secured in the blade 12 and projects into the slots 36 on both sides of the arm 20 in sliding relation thereto.

The ram 11 is provided with a central longitudinal bore 47 which extends from the rear face 48 of the ram 11, forward to the slot 35 and which is reamed adjacent to the rear face 48 to receive in press fit relation a stationary micro screw nut 49 which is provided with a female threaded bore adapted to receive and engage the male threaded portion 50 of the micro screw stem 32 in rotatable relation. The micro screw stem 32 has a shoulder 51 which projects into a counterbore in the bearing sleeve 31 and which together with a lock nut 51' threaded on the stem 32 is adapted to lock the micro screw against any lateral movement in the supporting plate 28. The rear end of the micro stem 32 is provided with an integral knurled knob 52 having suitable calibrated indicia around its diameter as commonly used on similar micrometer adjusting heads. Clockwise rotation of the knob 52 rotates the stem 32 in the stationary bearing sleeve 31 and the male threaded portion 50 in the female threaded micro screw nut 49 which being integral with the ram 11 causes the ram to move longitudinally to the left or forward. Similarly counter-clockwise rotation of the knob 52 causes the ram 11 to move to the right or rearwardly.

It is therefore apparent that unilateral movement of the ram 11 caused by rotation of the micro screw knob 52 will impart this movement to the bottom end of the blade member 12 by means of the pivot pin 43 about which the blade rotates in a plane on the horizontal center line 41 of the ram and micro screw. As unilateral movement is imparted to the bottom end of the blade 12 through the pin 43 the upper guide pin 46, which is integral with the blade and confined in the slots 36, is caused to move downwardly on the vertical axis line 36' of the slots in direct vertical alignment with the intersection point A on the ram.

It will be noted that unilateral movement of the pin 43 to either side of the vertical line 36' in the plane of center line 41, as for example to the point A' (shown in dotted line in FIG. 2) will cause pin 46 to move vertically on line 36' to point B' thereby establishing a theoretical right angle (90°) triangle having sides A-A', A-B', and a hypotenuse A'-B' which will remain constant at all times. A set screw 58 may be utilized to lock the protractor at any angle setting if desired.

Suitable calibrated indicia is inscribed as at 53 on the front face 33 of the sliding ram 11, and as at 54 on the front surface 18 of the body 10, to provide a direct reading (preferably in thousandths of an inch) of the relative unilatreal movement of the ram relative to the body at either side of point "O."

The calibrated indicia 53 on the ram member is in this instance preferably a scale calibrated in increments of ninety-eight thousandths (.098) of an inch. The indicia 54 on the body is in this instance preferably calibrated in increments of fifty thousandths (.050) of an inch, which is the exact distance that a single revolution of the micrometer screw 13 is designed to precisely move the ram 11. This feature provides for a constant check on the accurate functioning of all the moving parts of the device and provides for a direct reading of the sine number which will be fully understood by referring to FIGS. 6, 7 and 8.

The principal object of this invention, as previously stated, is to determine accurate angular measurements on a workpiece by direct reading of a calibrated scale to obtain a linear dimension or sine number which may be readily transposed into degrees, minutes and seconds by simply referring to the trigonometric sine, cosine tables which is to be found in most technical or machinists' hand books. In order to more fully illustrate the principal function of the adjustable protractor, there is shown in FIGS. 2, 6, 7 and 8 a conventional surface plate 55 and a workpiece 56 having an angular surface 57 forming the angle "C" (with the vertical face of the blade 12) which is to be determined as above stated.

To obtain the degree of the angle C the sine-square is placed on the surface plate 55 with the bottom surface 15 of its body 10 in flush contact with the top surface of the plate, and the front face 37 of the blade 12 in contact with the upper corner of the workpiece 56. The micrometer screw knob is then rotated clockwise moving the ram and the lower end of the blade to the left until the face 37 of the blade is in full contact with the angular surface 57 of the workpiece. The accuracy of the surface 57 may then be determined by direct sighting between said surface and the surface 37' of the blade which is shown in dotted lines.

The degree of the angle C may be readily determined by direct reading of the linear distance moved by the ram on the calibrated scales 53 and 54. The linear distance thus measured is actually also the same distance that the pin 43 moves from point A to point A' and the distance A-A' is actually the sine (number) of a right angle triangle formed by sides A-A', A'-B' and B'-A, of which side A'-B' represents the constant radius of a 2" circle or the hypotenuse of the triangle. As trigonometric tables for obtaining the degree of a needed angle or the sides of said triangle are based on the use of a 1" radius, and the radius used for practical application of my protractor is 2", the indicia 53 and 54 have been calibrated to give a direct reading of the linear distance A-A' which is equal to one-half of the actual distance.

Therefore, in the functional examples shown by dotted lines in FIG. 2 and in full scale in FIG. 6, the direct reading on the scales 53 and 54 shows a linear movement of five hundred thousandths of an inch (.500), reference to the trigonometric sine tables would indicate that the angle C or the sine angle was exactly thirty degrees (30°).

In the functional example shown in full scale in FIG. 7, the direct reading on the scales shows a linear movement of seven hundred seven thousandths of an inch (.707), reference to the sine tables again would indicate that the sine angle was exactly forty-five degrees (45°).

In the functional example shown in full scale in FIG. 8 it should be noted that the blade end has been moved to the right side of the vertical line A-B' to determine the adjacent angle to that shown in FIGS. 6 and 7 but the method of determining the angle remains the same; therefore the direct reading on the scales shows a direct reading of one hundred ninety-nine thousandths (.199), reference to the sine tables again would indicate that the sine angle was exactly eleven degrees and twenty-nine minutes (11° 29').

FIGS. 6, 7 and 8 as previously stated, show views of the present adjustable protractor which have been made to the actual scale size of the device, having the hypotenuse of the triangle (A'-B') represented by the dimension "X," and the side of the triangle (A-A') represented by the dimension "Y," in order to more clearly illustrate the basic principle, or the sine of the angle calculation upon which my device is based as follows:

$X = 2''$ hypotenuse (which is constant)
$Y = (.000)$ side (unilateral movement-read on scales)

$$\text{Sine } \Theta = \frac{Y}{X}$$

Therefore (∴) sine $\Theta = \dfrac{Y}{2}$

If "$X$" = 1.000 in.
Then sine $\Theta = Y$

The above calculation is based on the present application utilizing a 2" "X" dimension and a 1.000" sine. This principle applies regardless of the "Y" dimension and the sine if proportion is maintained. Further, the principle applies regardless of how the unilateral movement of the ram 11, or dimension "Y" is obtained, that is by the micrometer adjusting screw member 13, or by a manually operated push-pull rod 13a as shown in FIGS. 6 and 7, so long as a direct accurate reading may be had from the calibrated scales.

As only one particular embodiment of my invention has been shown and described, it is to be understood that modifications may be made therein without departing from the spirit and scope of the invention, as set forth in the appended claims.

What is claimed is:

1. A tool of the character described comprising
a body
    having
    a flat base surface,
an actuator slide
    carried by and movable lengthwise of said body parallel to said base surface, and
a blade
    having
    a longitudinal work contacting edge,
        said blade being connected to said actuator slide by
    a fixed pivot
        and to said body by
    a sliding pivot,
        said pivot connections when on a line exactly at right angles to said base surface holding said blade with said work contacting edge precisely at right angles to said base surface,
        said fixed pivot connection being movable with said actuator slide in one direction from said line to position said work contacting edge in acute angular relation to said base surface and in the opposite direction from said line to position said work contacting edge in obtuse angular relation to said base surface.

2. A tool of the character described comprising
a body having
    a flat base surface
        and
    a slot
        defining
    laterally spaced arm portions,
an actuator slide
    carried by and movable lengthwise of said body parallel to said base surface,
a blade
    having
    a work contacting edge
        and disposed bodily entirely above the base surface of said body and in said slot,
a fixed pivot connection
    between said blade and said slide,
followers
    on said blade above said fixed pivot fitting snugly but slidably in
elongated ways
    provided in the arm portions of said body and extending precisely at right angles to the direction of travel of said actuator slide and to said base surface,
    said followers and said ways comprising
a sliding pivot connection
    between said blade and said body,
    said fixed and sliding pivot connections when on a line exactly at right angles to said base surface holding said blade with said work contacting edge precisely at right angles to said base surface,
    said fixed pivot connection being movable with said actuator slide in one direction from said line to position said work contacting edge in acute angular relation to said base surface and in the opposite direction from said line to position said work contacting edge in obtuse angular relation to said base surface.

3. A tool of the character described comprising
a body
    having
    a flat base surface,
an actuator slide
    carried by and movable lengthwise of said body parallel to said base surface,
a blade
    having
    a longitudinal work contacting edge,
        said blade being connected to said actuator slide by
    a fixed pivot
        and to said body by
    a sliding pivot,
        said pivot connections when on a line exactly at right angles to said base surface holding said blade with said work contacting edge precisely at right angles to said base surface,
        said fixed pivot connection being movable with said actuator slide in one direction from said line to position said work contacting edge in acute angular relation to said base surface and in the opposite direction from said line to position said work contacting edge in obtuse angular relation to said base surface, and
an indicator
    on said actuator slide coacting with
a scale on said body
    to denote the angular position of said blade,
    said scale being calibrated in sine dimensions which are functions of the angular positions of said blade.

4. A tool of the character described comprising
a body
    having
    a flat base surface,
a slide
    carried by and movable relative to said body parallel to said base surface,
an actuator
    mounted for rotation on said body and screw threadably connected to said slide so that rotation of said actuator moves said slide linearly relative to said body,
a blade
    having
    a longitudinal work contacting edge,
        said blade being connected to said slide by
    a fixed pivot
        and to said body by
    a sliding pivot,
        said pivot connections when on a line at right angles to said base surface holding said blade with said work contacting edge also precisely at right angles to said base surface,
        said fixed pivot being movable with said actuator in one direction from said line to position said work contacting edge in acute angular relation to said base surface and in the opposite direction from said line to position said work contacting edge in obtuse angular relation to said base surface, and
an indicator
    on said slide coactive with
a scale
    on said body to denote the angular portion of said blade,
    said scale being calibrated in sine dimensions which are functions of the angular positions of said blade, and the distance between divisions of said scale being equal to the lead dimension of said threaded connection between said actuator and said slide.

5. A tool of the character described comprising
a body
   having
a flat base surface
   and
a slot defining laterally spaced arm portions,
a slide
   carried by and movable relative to said body parallel to said base surface,
micrometer adjusting screw means
   including
a rotatable micro screw stem
   carried by said body and
a micro screw nut
   carried by said slide and mounted to travel on said stem,
   whereby rotation of the latter moves said slide linearly relative to said body,
a blade
   having
a longitudinal work contacting edge
   and disposed bodily entirely above the base surface of said body and in said slot,
a fixed pivot connection
   between said blade and said slide,
followers
   on said blade above said fixed pivot fitting snugly but slidably in
elongated ways
   provided in the arm portions of said body and extending precisely at right angles to the direction of travel of said slide and to said base surface,
   said followers and said ways comprising
a sliding pivot connection
between said blade and said body, said fixed and sliding pivot connections when on a line exactly at right angles to said base surface holding said blade with said work contacting edge precisely at right angles to said base surface, said fixed pivot connection being movable with said slide in one direction from said line to position said work contacting edge in acute angular relation to said base surface and in the opposite direction from said line to position said work contacting edge in obtuse angular relation to said base surface, and an indicator
   on said slide coactive with
a scale
   on said body to denote the angular position of said blade,
   said scale being calibrated in sine dimensions which are functions of the angular positions of said blade,
   and the distance between divisions of said scale being equal to the lead dimension of the threaded connection between said micro screw stem and said micro screw nut.

References Cited by the Examiner

UNITED STATES PATENTS

| | | | |
|---|---|---|---|
| 1,069,555 | 8/13 | Levine | 33—31 |
| 2,056,948 | 10/36 | Bensen | 33—75 |
| 2,138,551 | 11/38 | Magenheimer | 33—88 |
| 2,996,804 | 8/61 | Hancox | 33—31 |
| 3,003,244 | 10/61 | Fogliano | 33—118 |

FOREIGN PATENTS 649,446    1/51    Great Britain.

ISAAC LISANN, *Primary Examiner.*